(12) United States Patent
Bohizic et al.

(10) Patent No.: US 7,827,451 B2
(45) Date of Patent: Nov. 2, 2010

(54) METHOD, SYSTEM AND PROGRAM PRODUCT FOR ESTABLISHING DECIMAL FLOATING POINT OPERANDS FOR FACILITATING TESTING OF DECIMAL FLOATING POINT INSTRUCTIONS

(75) Inventors: Theodore J. Bohizic, Hyde Park, NY (US); Mark H. Decker, Rhinebeck, NY (US); Ali Y. Duale, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1197 days.

(21) Appl. No.: 11/420,045

(22) Filed: May 24, 2006

(65) Prior Publication Data

US 2007/0277022 A1 Nov. 29, 2007

(51) Int. Cl.
*G01R 31/28* (2006.01)
(52) U.S. Cl. .............................. 714/724; 708/495
(58) Field of Classification Search ............... 717/143; 708/504, 505, 204, 495; 714/38, 724
See application file for complete search history.

(56) References Cited

U.S. PATENT DOCUMENTS

| | | | | |
|---|---|---|---|---|
| 4,821,228 A | 4/1989 | Wickes et al. | ............... | 364/900 |
| 4,866,651 A | 9/1989 | Bleher et al. | ............... | 364/748 |
| 5,241,491 A | 8/1993 | Carlstedt | ................... | 364/716 |
| 5,339,427 A | 8/1994 | Elko et al. | ................. | 395/725 |
| 6,571,381 B1 | 5/2003 | Vorbach et al. | ............... | 716/16 |
| 7,389,499 B2 * | 6/2008 | Donovan et al. | ............ | 717/143 |
| 7,467,174 B2 * | 12/2008 | Wang et al. | ................. | 708/504 |
| 7,519,645 B2 * | 4/2009 | Carlough et al. | ............ | 708/505 |
| 7,546,328 B2 * | 6/2009 | Schulte et al. | .............. | 708/505 |
| 7,685,214 B2 * | 3/2010 | Chen et al. | ................. | 708/204 |

FOREIGN PATENT DOCUMENTS

JP 60-200338 9/1985

OTHER PUBLICATIONS

Duke, K.A., "Decimal Floating Point Processor", IBM Technical Disclosure Bulletin, pp. 862, Nov. 1969.
Duale et al., "Generation of Effective Pseudo-Random Test Cases for Large Computer Systems", Proceeding of the Seventh World Multi-Conference on Systematics, Cybernetics and Informetics, pp. 129-133, Orlando, Jul. 2003.
IBM Labs in Haifa, "Floating-Point Test-Suite for IEEE", Version 1.01: May 2005.

* cited by examiner

*Primary Examiner*—David Ton
(74) *Attorney, Agent, or Firm*—Geraldine Monteleone, Esq.; Kevin P. Radigan, Esq.; Heslin Rothenberg Farley & Mesiti P.C.

(57) ABSTRACT

A method, system and program product are provided for establishing one or more decimal floating point (DFP) operand for facilitating testing of a decimal floating point instruction. The method includes obtaining an encoded DFP operand previously generated for testing the decimal floating point instruction, and logically modifying at least one bit of the encoded DFP operand without decoding the encoded DFP operand to obtain an additional encoded DFP operand. In one embodiment, m sequential bits of the encoded DFP operand, n randomly generated bits (wherein n=m), and a logical operation (such as an AND, OR, XOR or SHIFT) are employed in modifying the previously generated, encoded DFP operand.

20 Claims, 3 Drawing Sheets

US 7,827,451 B2

METHOD, SYSTEM AND PROGRAM PRODUCT FOR ESTABLISHING DECIMAL FLOATING POINT OPERANDS FOR FACILITATING TESTING OF DECIMAL FLOATING POINT INSTRUCTIONS

TECHNICAL FIELD

This invention relates in general to floating point instruction testing, and more particularly, to computer-implemented methods, systems and program products for establishing decimal floating point operands for facilitating testing of one or more decimal floating point instructions of a decimal floating point computing unit.

BACKGROUND OF THE INVENTION

A significant portion of commercial data is represented in decimal format. In contrast, the most widely used hardware-implemented format is binary floating point (BFP) format, which fails to correctly perform decimal calculations. Therefore, applications that use decimal data pay heavy penalties in performance since they require use of software for performing decimal arithmetic. Thus, the decimal floating point (DFP) format of a decimal floating point computing unit implemented in hardware has inherent advantage in reducing the run time of such applications. The decimal floating point format is described in various publications, including an International Business Machines Corporation publication by IBM Labs in Haifa entitled "Floating-Point Test-Suite for IEEE", Version 1.01; May 2005, the entirety of which is hereby incorporated herein by reference.

As is known, test cases are employed in testing of instructions. The effectiveness of test cases generated in pseudo-random fashion mainly depends upon the overhead encountered during test case generation. In decimal floating point testing, selecting meaningful operands can significantly contribute to such overhead. Since the contents of floating point registers (containing DFP operands) are interpreted to have only encoded (packed) data, substantial time may be spent on generating and encoding these operands before placing them in floating point registers. A means for reducing this overhead related to pseudo-random generation of decoded DFP operands, and then encoding of the operands, is needed in order to enhance the testing process. Furthermore, since operand interdependency is significant in overall test effectiveness, techniques to enhance such interdependency are desired to improve instruction test quality. The present invention is directed to meeting these needs.

SUMMARY OF THE INVENTION

Briefly summarized, the present invention comprises in one aspect a computer-implemented method for establishing one or more decimal floating point (DFP) operand for facilitating testing of at least one decimal floating point instruction. The method includes: obtaining an encoded DFP operand previously generated for testing a decimal floating point instruction; and modifying the encoded DFP operand without decoding the encoded DFP operand to generate at least one additional encoded DFP operand for testing the at least one decimal floating point instruction.

In another aspect, a computer-implemented method for establishing decimal floating point (DFP) operands for facilitating testing of a decimal floating point instruction is provided. This method includes: for each of at least some operands of a plurality of operands to be established, generating and saving the operand in an operand list, the generating including selecting an operand type, generating DFP operand components in decoded format, encoding the DFP operand components, and saving the encoded DFP operand in the operand list; and for each of at least some other operands of the plurality of DFP operands, selecting an encoded DFP operand from the operand list and logically modifying at least one bit of the selected encoded DFP operand without decoding the selected encoded DFP operand to obtain a modified encoded DFP operand.

In yet another aspect, a system for establishing a decimal floating point (DFP) operand for facilitating testing of a decimal floating point instruction is provided. The system includes means for obtaining an encoded DFP operand previously generated for testing a decimal floating point instruction; and means for automatically modifying the encoded DFP operand without decoding the encoded DFP operand to generate at least one additional encoded DFP operand for use in testing the decimal floating point instruction.

In a further aspect, at least one program storage device readable by at least one computer, tangibly embodying at least one program of instructions executable by the at least one computer is provided to perform a method for establishing a decimal floating point (DFP) operand for facilitating testing of a decimal floating point instruction. The method includes: obtaining an encoded DFP operand previously generated for testing a decimal floating point instruction; and modifying the encoded DFP operand without decoding the encoded DFP operand to generate at least one additional encoded DFP operand for testing the decimal floating point instruction.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Advantageously, presented herein is a technique for establishing one or more decimal floating point operands for facilitating testing of at least one decimal floating point instruction, and hence testing of a decimal floating point computing unit. The technique includes obtaining an encoded DFP operand previously pseudo-randomly generated for testing at least one decimal floating point instruction, and modifying (or reusing) the encoded DFP operand without decoding the encoded DFP operand to generate at least one additional encoded DFP operand for use in testing that least one decimal floating point instruction.

Advantageously, this technique minimizes the effort spent on generating meaningful DFP operands, and ensures correlation among operands. New operands are generated from previously generated operands, by simply modifying one or more bits of the previously generated operand using a simple logical operation. Using this approach, pseudo-random test cases with high degree of operand correlation can be created, and time spent on generating DFP operands is significantly reduced since different DFP operands can quickly be generated from previously generated DFP operands whose encoding into DFP format took a longer time. Further, this operand reuse enables the creation of different variations of the same DFP operand (since a DFP operand can have redundant forms).

Figure 1:
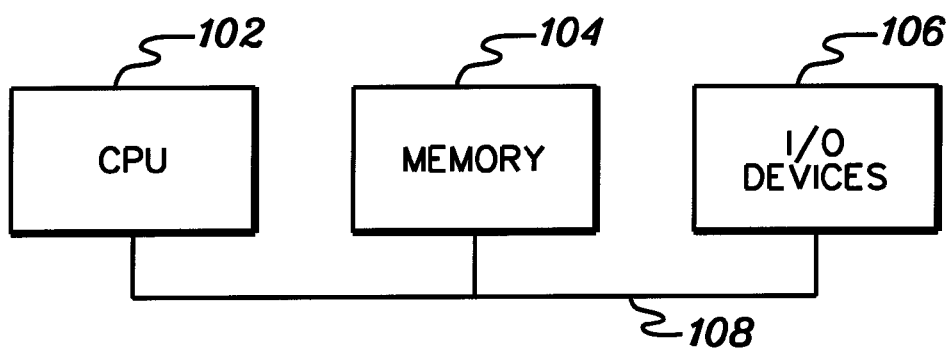
FIG. 1 depicts one embodiment of a computing environment incorporating one or more aspects of the present invention.

One embodiment of a computing environment 100 incorporating and using one or more aspects of the present invention is described below with reference to FIG. 1. Computing environment 100 is based, for instance, on the z/architecture offered by International Business Machines Corporation, Armonk, N.Y. The z/architecture is described in an IBM® publication entitled "z/Architecture Principles of Operation," IBM Publication No. SA22-7832-04, Fifth Edition (September 2005), which is hereby incorporated herein by reference in its entirety. (IBM® is a registered trademark of International Business Machines Corporation, Armonk, N.Y., USA. Other names used herein may be registered trademarks, trade names or product names of International Business Machines Corporation or other companies.) In one example, a computing environment based on the z/architecture includes an eServer zSeries unit, offered by International Business Machines Corporation, Armonk, N.Y.

By way of example, computing unit 100 is shown to include a central processing unit 102, a memory 104 (e.g., main memory), and one or more input/output (I/O) devices 106 coupled to one another via, for example, one or more busses 108.

Figure 2:
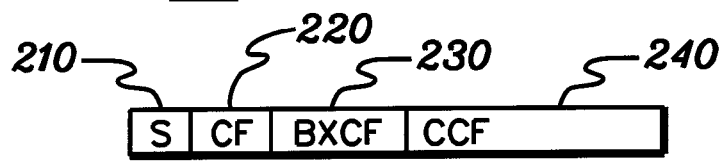
FIG. 2 depicts one embodiment of an encoded decimal floating point operand format, in accordance with IEEE standard.

As noted, for certain applications, hardware-implemented, decimal floating point computing units are believed to provide advantage over binary floating point computing units. In support of decimal floating point computing units, test cases are necessary in order to facilitate testing of decimal floating point instructions. Aspects of this invention are directed to techniques for facilitating generation of decimal floating point instruction operands for such test cases. Before discussing operand generation embodiments, the decimal floating point (DFP) operand format is reviewed. Unlike binary and hexadecimal floating point operands, DFP operands are typically stored in registers in a specially encoded and more complex format. According to IEEE standard 754R, DFP numbers are represented as densely packed decimals (DPD) (as illustrated in FIG. 2).

Decimal floating point (DFP) data, which is more complex than other data types used in arithmetic and logical operations, is presented to a DFP computing unit or machine in encoded format. FIG. 2 depicts one example of an encoded DFP operand 200 format where: the S field 210 is a 1-bit sign field, the CF field 220 is a combination field, which is a 5-bit encoded field including the leftmost digit of the operand and the leftmost two bits of the exponent; the BXCF field 230 is the biased exponent continuation field, which is the rest of the exponent (e.g., 6, 8 and 12 bits for short, long and extended formats, respectively); and the CCF field 240 is a coefficient continuation field, which includes the coefficients without the leftmost digit. In the CCF field, each three binary coded decimals (BCD) digits are encoded using 10 bits of DPD. The translation of the three BCD digits to the 10-bit DPD creates 24 redundant combinations.

The encoding and decoding of the CF field are shown in Table 1.

TABLE 1

| Leftmost digit | Leftmost two-bits of biased exponent | | |
|---|---|---|---|
| | 0 | 1 | 2 |
| 0 | 00000 | 01000 | 10000 |
| 1 | 00001 | 01001 | 10001 |
| 2 | 00010 | 01010 | 10010 |
| 3 | 00011 | 01011 | 10011 |
| 4 | 00100 | 01100 | 10100 |
| 5 | 00101 | 01111 | 10101 |
| 6 | 00110 | 01111 | 10110 |
| 7 | 00111 | 01111 | 10111 |
| 8 | 1100 | 11010 | 11100 |
| 9 | 11001 | 11011 | 11101 |

The CCF field is divided into groups of 10 bits. Each group is decoded to create three BCD digits. The translations between BCD and DPD are shown in Tables 2 and 3. In Table 2, three 10-bit DPD digits (pqr stu v wxy) are created from three 12-bit BCD digits (abcd efgh ijkm). Similarly, Table 3 shows the conversion of three 10-bit DPD digits to three 12-bit BCD digits.

TABLE 2

| aei | pqr stu v wxy |
|---|---|
| 000 | bcd fgh 0 jkm |
| 001 | bcd fgh 1 00m |
| 010 | bcd jkh 1 01m |
| 011 | Bcd 10h 1 11m |
| 100 | Jkd fgh 1 10m |
| 101 | Fgd 01h 1 11m |
| 110 | Jkd 00h 1 11m |
| 111 | 00d 11h 1 11m |

TABLE 3

| vxwst | abcd | efgh | ijkm |
|---|---|---|---|
| 0---- | 0pqr | 0stu | 0wxy |
| 100--- | 0pqr | 0stu | 100y |
| 101-- | 0pqr | 100u | 0sty |
| 110-- | 100r | 0stu | 0pqy |
| 11100 | 100r | 0pqu | 100y |
| 11110 | 0pqr | 100u | 100y |
| 11111 | 100r | 100u | 100y |

DFP operands need to be decoded before they are used for execution and encoded before they are delivered as results. New rounding modes are introduced for DFP instructions. The operands are not normalized and, therefore, each operand can have redundant representations. Similar to the binary and hexadecimal floating points, DFP numbers and Not-a-Numbers (NaNs) are represented in floating point registers (FPRs) in any of three data formats: short (32 bits), long (64 bits), or extended (128 bits).

The CF field with special code of '11111'b signifies a NaN, while '11110' b indicates infinity. An infinity with a coefficient of all zeros is called "default infinity".

Initially, instruction operands for test cases can be generated either pure randomly or pseudo-randomly. Pure random generation generally takes longer to test, and provides unreliable test coverage. Pseudo-random generation results in better test coverage, reduced test time, but requires significant overhead. In DFP testing, selecting meaningful operands significantly contributes to the testing overhead. Since the floating point registers contain only encoded data, substantial time can be spent on generating and encoding these operands. Thus, a technique is needed to reduce pseudo-random test case generation overhead in order to speed up the test process.

Enhancing operand interdependency is also desirable to improve test quality since operand interdependency plays a significant role in overall test effectiveness. As noted above, realizing DFP operand interdependency is complicated due to the fact that the operands are encoded, and the same operand can be represented a number of different ways.

Proposed herein is, in one aspect, an operand generation approach which minimizes effort spent on generating meaningful DFP data, while enhancing correlation among the operands employed. During test case build, operands can be generated: (1) randomly, (2) by targeting one of the DFP data classes (with some bias towards the extremes), and/or using different combinations of predefined CCF fields, or (3) from previously generated operands, as described hereinbelow.

Figure 3:
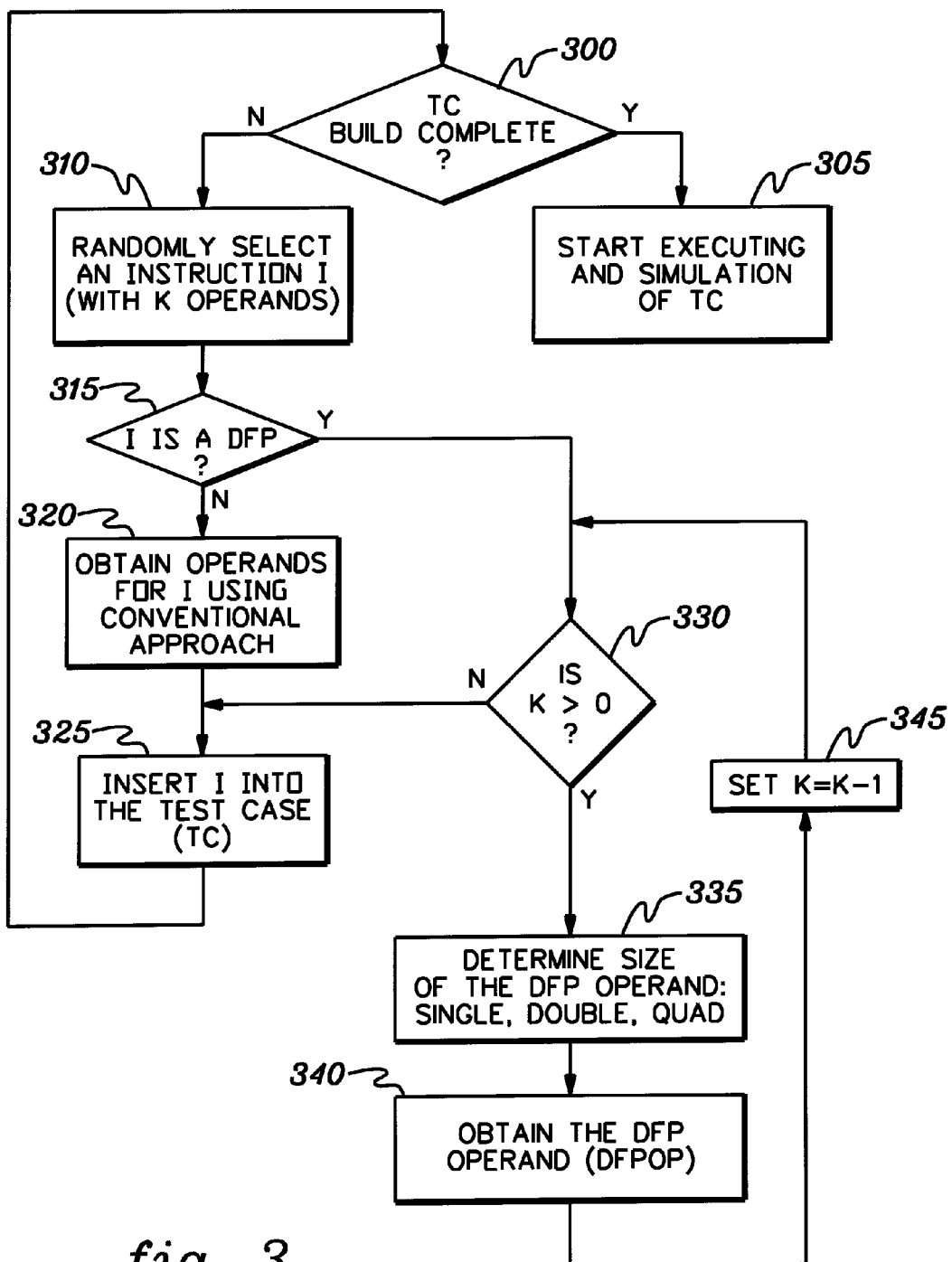
FIG. 3 is a flowchart of one embodiment of a process for building a test case for testing one or more decimal floating point instructions, in accordance with an aspect of the present invention.

FIG. 3 depicts one embodiment of a test case build process, in accordance with an aspect of the present invention. The process includes determining whether the test case (TC) build is complete 300, and if "yes", then execution and simulation of the test case using the generated decimal floating point instruction(s) and operand(s) can be started 305.

Assuming that the test case build is not complete, then an instruction I with k operands is randomly selected 310. If instruction I is not a DFP instruction 315, then processing obtains operands for instruction I using any conventional approach 320, dependant on the type of instruction. Instruction I is then inserted into the test case 325 and processing again determines whether the test case build is complete 300.

If instruction I is a DFP instruction, then processing determines whether the current value of k is greater than zero 330, i.e., whether all operands have been generated for the instruction. If k is zero, then instruction I is inserted into the test case 325 and processing returns to determine with the test case build is complete. Assuming that the value of k is one or greater, then processing determines a size for the DFP operand to be generated 335. As one example, the size is short (i.e., single), long (i.e., double), or extended (i.e., quad). The DPF operand is then obtained 340, using for example, the process flow of FIG. 4. After the DFP operand is obtained, processing decrements the value of k 345 and again inquires whether the current value of k is greater than zero. Once all operands have been established for the DFP instruction I, then the instruction is inserted into the test case 325 and processing ascertains whether test case build is complete 300.

Figure 4:
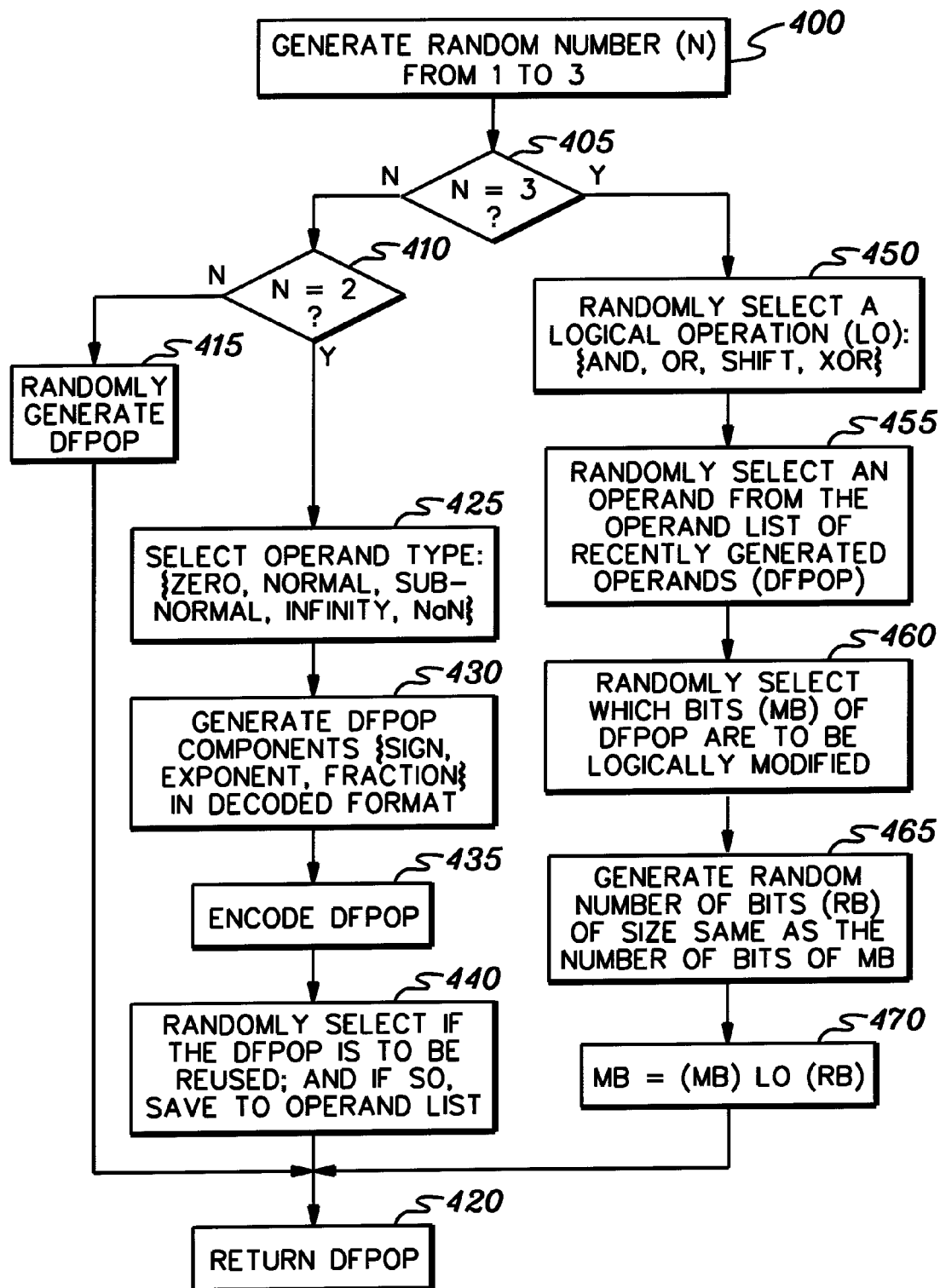
FIG. 4 is a flowchart of one embodiment for establishing decimal floating point operands for a test case build process, in accordance with an aspect of the present invention.

As noted, FIG. 4 depicts one embodiment for obtaining a DFP operand. As used herein, "obtaining" broadly mean constructing, generating, modifying, reusing, etc. In accordance with this examplary implementation, a number N from one to three is randomly generated 400 and is used to determine whether to randomly generate the DFP operand, pseudo-randomly construct a new operand, or modify an existing, previously pseudo-randomly constructed operand. Thus, processing determines whether N=3, 405. If "no", then processing determines whether N=2, 410. If again "no", then the DFP operand (DFPOP) is randomly generated 415 and returned as the DFP operand 420 for the current instruction (refer to FIG. 3).

Assuming that N=2, then processing pseudo-randomly constructs a meaningful operand. In this implementation, an operand type is selected 425. As noted above, the operand type is zero, normal, subnormal, infinity, or NaN in decoded format. The DFP operand components, including sign, exponent, fraction, are then generated in decoded format 430, after which the operand is encoded 435. Processing then randomly determines whether this DFP operand is to be saved in an operand list 440 (for possible reuse as described further below). Since DPF operands differ in their precisions (single, double, and quad), multiple operand lists are maintained, i.e., one for each precision type. By way of example, each operand list may contain 100 operands, which are randomly updated to maintain the lists current. The pseudo-randomly constructed operand is then returned for use with the instruction 420.

By way of further example, pseudo-random generation of a DFP in decoded format may include: randomly selecting a sign; randomly generating an exponent, based on the precision (single, double or quad) and making sure the extremes are covered; adding an exponent bias to the exponent; and generating the fraction, while assuring that the generation allows for special cases such as repeating patterns. Encoding of the constructed DFP operand may include: creating the CF field from the leftmost digit of the fraction and the two leftmost bits of the exponent (see Table 1); forming the BXCF field from the remaining bits of the exponent; and from each twelve bits of the remaining fraction bits (fraction without the leftmost digit), generating the corresponding 10 DPD bit (see Table 2) to form the CCF field.

Assuming that the randomly generated number N equals three, then processing reuses or modifies an existing DFP operand from one of the operand lists noted above. In particular, processing randomly selects a logical operation (LO) to be employed 450. The logical operation may include, for example, one or more of an AND, OR, SHIFT, XOR, etc. Processing then randomly selects from the operand list of recently constructed pseudo-random operands a particular encoded DFP operand 455, and randomly selects which one or more sequential bits (MB) of this encoded DFP operand are to be logically modified 460. The number of bits randomly selected from the encoded DFP operand may be any number between 1 and the total number of bits of the operand. An equal number of random bits (RB) are then generated 465 and the encoded DFP operand is logically modified by logically combining the selected one or more bits (MB) of the encoded operand and the randomly generated corresponding number of bits (RB) 470. The resultant encoded DFP operand is then returned as the DFP operand for the particular instruction 420.

Advantageously, those skilled in the art will note from the above description that a new operand is generated from a previously constructed or generated operand by modifying one or more bits of the previously constructed operand using a simple logical operation, such as an AND, OR, SHIFT, XOR, etc. operation. By way of example, multiple representations (cohorts) of a number (e.g., zero) can be generated with different permutations of the exponent. This can be done by shifting leading/trailing zeros (while altering the exponent and keeping a same value, with different precisions). For a non-zero number, this becomes significant especially when the value cannot be represented unless shifted (e.g., 5.000E (max_exponent+3) versus 5000E (max_exponent)).

The advantages of this reuse approach include interdependency and a reduction in testing overhead. Since the modified DFP operand is derived from a previously constructed and encoded operand, operand interdependency and hence test case quality are enhanced. For example, two numbers can readily be generated with the same magnitude, but different signs for the same instruction. Further, the effort spent on generating new operands from previously constructed is significantly smaller compared to the effort needed in generating/constructing a new operand, while enhancing the correlations among the DFP operands. In the reuse case, no decoding or encoding is needed. Table 4 below presents various examples of operand reuse.

TABLE 4

| TO BE REUSED | = | 12F8AD44ACB8F91C | = | 4.921212585858812E−193 |
|---|---|---|---|---|
| MODIFIED OP | = | 1FBFAD44ACB8F91C | = | 7.927212585858812E−144 |
| TO BE REUSED | = | 258D5AABF76E0D83 | = | 1.294949676703303E−28 |
| MODIFIED OP | = | 258D5AABF72E0183 | = | 1.294949672700303E−28 |
| TO BE REUSED | = | 53F46EC7EF58F89C | = | 4.888897575858910E+382 |
| MODIFIED OP | = | 53F46EC7EF22D79C | = | 4.888897572135916E+382 |
| TO BE REUSED | = | 004C0000005A0000 | = | 5.500000E−373 |
| MODIFIED OP | = | 004C000000000000 | = | 0E−379 |
| TO BE REUSED | = | 258D5AABF76E0D83 | = | 1.294949676703303E−28 |
| MODIFIED OP | = | 3F3F5AABF76E0D83 | = | 7.694949676703303E+80 |
| TO BE REUSED | = | 7C0A42429298ECE | = | NaN:442280229123588 |
| MODIFIED OP | = | FC0A424292928ECE | = | −NaN:442280229123588 |
| TO BE REUSED | = | 44F51232E3EB2CA1 | = | 2.585858585212494E+277 |
| MODIFIED OP | = | C4F51232E3EB2CA1 | = | 2.585034181212494E+277 |
| TO BE REUSED | = | 4A52CB8FACB44A5A | = | 4.767670303030676E−373 |
| MODIFIED OP | = | 4A52CB0D08B44A5A | = | 4.767670303030676E−381 |
| TO BE REUSED | = | 102BE7DC1830C376 | = | 4.767670303030676E−373 |
| MODIFIED OP | = | 100BE7DC1830C376 | = | 4.767670303030676E−381 |
| TO BE REUSED | = | 102BE7DC1830C376 | = | 4.767670303030676E−373 |
| MODIFIED OP | = | 002BE7DC1830C376 | = | 7.67670303030676E−374 |

As a further variation, when a new operand is pseudo-randomly constructed without going through operand reuse (i.e., N=2 in the example of FIG. 4), it can be randomly decided whether one of the entries in the list of operands is to be replaced with this newly generated operand. Randomly updating the operand list(s) enables the approach to maintain the dynamic nature of the test case generation.

Further, the method used for generating operand data may be to form operands from combinations of predefined DPD sets. This step would be useful especially when operands of the same instruction are desired to have values that are the same, but encoded differently (for example, in different forms of the redundant DPD).

For experimental purposes, the DFP ADTR (i.e., ADD) instruction has been run with different operand reuse percentages. For simplicity, when an operand is to be reused, only a single bit of the operand was inverted. Using System Assurance Kernel (SAK) test case generation tool (offered by International Business Machines Corporation), ten copies of a test exerciser were started on a logical partition of an International Business Machines Corporation System z9 machine with five CPUs. The SAK test generation tool is described further, for example, in a publication by Duale et al. entitled "Generation of Effective Pseudo-Random Test Cases for Large Computer Systems", Proceeding of the Seventh World Multi-Conference on Systematics, Cybernetics and Informetics, pp. 129-133, Orlando, July 2003. Each copy was designed to run 100 million copies of the ADTR instruction and two load instructions needed for each ADTR to load the input operands. Therefore, each copy should run 300 million instructions. The number of times that each of the following cases occur was monitored:

Case 1:|Op1|=|Op2| and Op1 !=Op2 (same magnitude but different signs)

Case 2: Op 1 biased exponent is between 1 and 3

The two extremes of the operand reuse show significant improvements in terms of number of instructions built and executed per minute and the number of times that the rare Case 1 is hit. When 90% of operand reuse is allowed, the test exerciser was generating, executing, and predicting as well as comparing results at a speed of 1,071,428 instructions per minute. On the other hand, the speed was 1,054,370 and 1,051,525 instructions per minute when operand reuse is allowed to be 50% and 0%, respectively. (Notice even when operand reuse is not permitted, Case 1 can happed specially when the two operands are +0 and −0.) Table 5 shows the number of times each Case 1 and 2 occurred in different operand reuse percentages. The table also indicates how long it took for each of the test exerciser copies to generate, execute, and predict and compare results of 300 million instructions (100 million ADRT instructions and their 200 million related load instructions). Note that the slower copies should have taken a little bit longer if the approach of running these copies was slightly modified. Once a copy finishes its runs, the other copies experience less CPU contentions and therefore run faster.

TABLE 5

| Operand reuse (%) | Case 1 | Case 2 | Duration (minutes) |
|---|---|---|---|
| 0 | 78 | 13680 | 285.3 |
| 10 | 239 | 14368 | 284.77 |
| 20 | 222 | 14860 | 284.74 |
| 30 | 284 | 15421 | 284.68 |
| 40 | 343 | 15372 | 284.62 |
| 50 | 301 | 15394 | 284.53 |
| 60 | 344 | 16050 | 284.45 |
| 70 | 444 | 16789 | 284.30 |
| 80 | 458 | 16954 | 284.21 |
| 90 | 592 | 18140 | 284.10 |

Those skilled in the art will note from the above discussion that the methods, system and program products described herein facilitate establishing one or more decimal floating point operands in significantly reduced time compared with pseudo-random generation of decimal floating point operands. By reusing or modifying previously pseudo-random generated DFP operands, new operands can be generated based on known and meaningful operands using simple logical manipulations. Further, different representations of the same operand are possible, as well as enhancing operand correlations to hit corner cases (i.e., hard to hit cases). Modifying an existing operand can include modifying a sign, an exponent or a fraction in the encoded DFP operand. Correlation is achieved by producing operands with comparable magnitude, etc.

The detailed description presented above is discussed in terms of program procedures executed on a computer, a network or a cluster of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are automatic machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

Aspects of the invention are preferably implemented in a high level procedural or object-oriented programming language to communicate with a computer. However, the inventive aspects can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another environment (such as the clustered computing environment). The system may be specially constructed for the required purposes to perform for example, the method steps of the invention or it may comprise one or more general purpose computers as selectively activated or reconfigured by a computer program in accordance with the teachings herein stored in the computer(s). The procedures presented herein are not inherently related to a particular computing environment. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method for establishing a decimal floating point (DFP) operand for facilitating testing of a decimal floating point instruction, the method comprising:
   obtaining an encoded DFP operand previously generated for testing a decimal floating point instruction; and
   modifying the encoded DFP operand without decoding the encoded DFP operand to generate at least one additional encoded DFP operand for testing the decimal floating point instruction.

2. The computer-implemented method of claim 1, wherein the modifying further comprises logically modifying m bits of the encoded DFP operand without decoding the encoded DFP operand to obtain the at least one additional encoded DFP operand, wherein m≧1.

3. The computer-implemented method of claim 2, wherein the logically modifying comprises employing a logical operation comprising at least one of an AND operation, an OR operation, an XOR operation or a SHIFT operation.

4. The computer-implemented method of claim 3, wherein the logically modifying further comprises randomly generating n bits, wherein n=m, and employing the m bits of the encoded DFP operand, the randomly generated n bits, and the logical operation in modifying the encoded DFP operand.

5. The computer-implemented method of claim 1, further comprising generating and saving, in an operand list, a plurality of encoded DFP operands, the encoded DFP operand being one encoded DFP operand of the plurality of encoded DFP operands, and wherein the obtaining further comprises randomly selecting the encoded DFP operand from the operand list, and wherein the modifying comprises logically modifying m bits of the encoded DFP operand without decoding the encoded DFP operand to obtain the at least one additional encoded DFP operand, wherein m≧1, and the computer-implemented method further comprises randomly selecting a logical operation from a set of logical operations for the logically modifying.

6. The computer-implemented method of claim 5, further comprising randomly selecting m sequential bits of the encoded DFP operand to be logical modified, randomly generating n bits, wherein n=m, and employing the m bits of the encoded DFP operand, the randomly generated n bits, and the logical operation in modifying the encoded DFP operand.

7. The computer-implemented method of claim 5, wherein the generating and saving further comprises, for each DFP operand, selecting an operand type, generating DFP operand components in decoded format, encoding the generated DFP operand components, and deciding to save the encoded DFP operand in the operand list.

8. A computer-implemented method for establishing decimal floating point (DFP) operands for facilitating testing of a decimal floating point instruction, the method comprising:
  for each of at least some operands of a plurality of operands to be established, generating and saving the operand in an operand list, the generating including selecting an operand type, generating DFP operand components in decoded format, encoding the DFP operand components, and saving the encoded DFP operand in the operand list; and
  for each of at least some other operands of the plurality of DFP operands, selecting an encoded DFP operand from the operand list and logically modifying m bits of the selected encoded DFP operand without decoding the selected encoded DFP operand to obtain a modified encoded DFP operand, wherein m≧1.

9. The computer-implemented method of claim 8, wherein the logically modifying comprises employing a logical operation comprising at least one of an AND operation, an OR operation, an XOR operation or a SHIFT operation.

10. The computer-implemented method of claim 9, wherein the logically modifying further comprises randomly generating n bits, wherein n=m, and employing the m bits of the encoded DFP operand, the randomly generated n bits, and the logical operation in modifying the selected encoded DFP operand.

11. The computer-implemented method of claim 8, wherein selecting the encoded DFP operand comprises randomly selecting the encoded DFP operand from the operand list, and wherein the computer-implemented method further comprises randomly deciding for each DFP operand of the plurality of operands to be established, whether to generate and save the operand, or to logically modify an encoded DFP operand from the operand list.

12. A system for establishing a decimal floating point (DFP) operand for facilitating testing of a decimal floating point instruction, the system comprising:
  means for obtaining an encoded DFP operand previously generated for testing a decimal floating point instruction; and
  means for modifying the encoded DFP operand without decoding the encoded DFP operand to generate at least one additional encoded DFP operand for use in testing the decimal floating point instruction.

13. The system of claim 12, wherein the means for modifying further comprises means for logically modifying m bits of the encoded DFP operand without decoding the encoded DFP operand to obtain the at least one additional encoded DFP operand, wherein m≧1.

14. The system of claim 13, wherein the means for logically modifying comprises means for employing a logical operation comprising at least one of an AND operation, an OR operation, an XOR operation or a SHIFT operation.

15. The system of claim 14, wherein the means for logically modifying further comprises means for randomly generating n bits, wherein n=m, and employing the m bits of the encoded DFP operand, the randomly generated n bits, and the logical operation in modifying the encoded DFP operand.

16. The system of claim 12, further comprising means for generating and saving, in an operand list, a plurality of encoded DFP operands, the encoded DFP operand being one encoded DFP operand of the plurality of encoded DFP operands, and wherein the means for obtaining further comprises means for randomly selecting the encoded DFP operand from the operand list, and wherein the means for modifying comprises means for logically modifying m bits of the encoded DFP operand without decoding the encoded DFP operand to obtain the at least one additional encoded DFP operand, wherein m≧1, and the system further comprises means for randomly selecting a logical operation from a set of logical operations for the logically modifying.

17. The system of claim 16, further comprising means for randomly selecting m sequential bits of the encoded DFP operand to be logical modified, randomly generating n bits, wherein n=m, and for employing the m bits of the encoded DFP operand, the randomly generated n bits, and the logical operation in modifying the encoded DFP operand.

18. The system of claim 16, wherein the means for generating and saving further comprises, for each DFP operand, means for selecting an operand type, for generating DFP operand components in decoded format, for encoding the generated DFP operand components, and for deciding to save the encoded DFP operand in the operand list.

19. At least one program storage device readable by at least one computer, tangibly embodying at least one program of instructions executable by the at least one computer to perform a method for establishing a decimal floating point (DFP) operand for facilitating testing of a decimal floating point instruction, the method comprising:
  obtaining an encoded DFP operand previously generated for testing a decimal floating point instruction; and
  modifying the encoded DFP operand without decoding the encoded DFP operand to generate at least one additional encoded DFP operand for testing the decimal floating point instruction.

20. The at least one program storage device of claim 19, wherein the modifying further comprises randomly selecting and logically modifying m bits of the encoded DFP operand without decoding the encoded DFP operand to obtain the at least one additional encoded DFP operand, wherein m≧1, and wherein the logically modifying further comprises randomly generating n bits, wherein n=m, and employing the m bits of the encoded DFP operand and the randomly generated n bits in logically modifying the encoded DFP operand.

* * * * *